United States Patent
Brook, III et al.

(10) Patent No.: US 6,169,611 B1
(45) Date of Patent: Jan. 2, 2001

(54) MOUNTING SYSTEM FOR A REMOVABLE MEDIA HOLDER IN A SCANNING APPARATUS

(75) Inventors: Mark G. Brook, III, Londonderry, NH (US); John A. MacNeill, Melrose; Aron M. Mirmelshteyn, Swampscott, both of MA (US); Mark E. Tellam, Exeter, NH (US)

(73) Assignee: Agfa Corporation, Wilmington, MA (US)

( * ) Notice: Under 35 U.S.C. 154(b), the term of this patent shall be extended for 0 days.

(21) Appl. No.: 08/997,765

(22) Filed: Dec. 24, 1997

(51) Int. Cl.$^7$ .................................................. H04N 1/04
(52) U.S. Cl. ......................... 358/487; 358/497; 358/474
(58) Field of Search ............................ 358/487, 475, 358/474, 497, 494, 498; 355/75; 399/211; 250/208.1, 234–236; 271/162–164

(56) References Cited

U.S. PATENT DOCUMENTS

| | | | |
|---|---|---|---|
| 4,768,068 | * 8/1988 | Partilla | 355/75 |
| 4,875,075 | * 10/1989 | Sootome et al. | 355/75 |
| 5,140,443 | 8/1992 | Iwahara et al. . | |
| 5,227,846 | 7/1993 | Leon . | |
| 5,341,225 | 8/1994 | Stern . | |
| 5,532,846 | * 7/1996 | Brook et al. | 358/497 |
| 5,663,812 | * 9/1997 | Pan | 358/474 |
| 5,790,278 | * 8/1998 | Ehrne et al. | 358/496 |
| 5,814,809 | * 9/1998 | Han | 250/208.1 |
| 5,818,611 | * 10/1998 | Shih | 358/474 |
| 5,966,221 | 10/1999 | Tellam et al. | 358/475 |

OTHER PUBLICATIONS

"Minolta Dimage Scan Dual" brochure 1997.

* cited by examiner

Primary Examiner—Cheukfan Lee
(74) Attorney, Agent, or Firm—Robert A. Sabourin

(57) ABSTRACT

A flat-bed scanner for scanning an original document, comprising a scanner housing and a scan carriage movably disposed for motion relative to the scanner housing. A sensing system is mounted to the scan carriage for scanning the original document. A media holder supports the original document for scanning along a scan line such that the original document is positioned at an object focal plane of the sensing system. The media holder support system dynamically maintains a portion of the original document proximate to the scan line coincident with the object focal plane during scanning. The support system includes a first mounting device pivotally attaching a first end of the media holder to the housing for allowing a pivot motion of the media holder with respect to the scanner housing and a second and a third mounting device are affixed and movable with the scan carriage for movably supporting the media holder during the motion of the carriage. The second and third mounting device support the media holder substantially below the scan line and proximate to marginal edges of the media holder outside the field of view of the scan line.

29 Claims, 17 Drawing Sheets

MOUNTING SYSTEM FOR A REMOVABLE MEDIA HOLDER IN A SCANNING APPARATUS

BACKGROUND

The field of the present invention is optical scanning of high-resolution color images, and in particular, the use of a flat-bed scanner system for the scanning of reflective and transmissive original documents at high resolution in a high volume production environment typical in the graphic arts electronic prepress industry. The original documents scanned by such systems included color or monochrome photographs, artwork, and they are composed of both text and graphics. The actual text and graphic image content of the scanned original document is referred to as an "original".

In use of a flat-bed scanner for reflective scanning, an original is placed with the surface containing the original document facing down on a flat transparent reference surface, typically glass. The original document is fixed on the surface such that a single scan line of the original document (hereinafter referred to as a "scan line") is illuminated by an illumination system from below, and the light reflected from the scan line is directed through an optical system to form an image of the scan line on a sensor such as a CCD array, which converts the optical signal to an electronic representation of the scan line, comprising a line of digital picture elements, or "pixels". The desired portion of the original document is scanned, one scan line at a time, by moving the original relative to the illumination system, optical system, and sensor along a direction hereinafter referred to as the "scanning axis". In systems typical of the prior art, such as that disclosed in U.S. Pat. No. 5,341,225, the illumination system, optical system and sensor are configured to move together as a unit in a moveable scan carriage. In other systems, such as those of U.S. Pat. No. 5,140,443 and U.S. Pat. No. 5,227,846 the original is moved while the illumination system, optical system and sensor remain fixed. In a production environment, original documents are scanned in sequence, with each requiring a preparation step in which the original to be scanned is located and fixed on the surface in proper alignment and registration, followed by the actual scanning operation.

A transparent original document, typically a photographic transparency, is an original on one side of a thin transparent substrate. In this case, the original is illuminated from the side opposite from that containing the optical system and sensor. Use of a single flat-bed scanner for both types of scanning involves a modal configuration change. Typically, a flipcover used in reflective scanning mode to hold the original document flat on the transparent surface is replaced by a transmissive illumination module which illuminates from above the portion of the original to be scanned. As in reflective-mode scanning, prior art systems are configured so that either the original or one or more scanner illumination, optics or sensor components move to carry out the scanning process.

In addition to reconfiguration of the illumination system, the magnification of the optical system is typically changed so that the same number of pixels imaged on the CCD array, and captured by the digitizing electronics, corresponds to a larger or smaller area of the original. In high1 resolution scanning systems typically in use in graphic arts electronic prepress processing, transparencies are oftentimes scanned at resolutions of 4,000 pixels per inch (ppi) or greater, while reflective originals are usually scanned at much lower resolutions, for example 1,200 ppi. Accordingly, it is a general problem in transmissive scanning which requires a higher resolution than reflective scanning that the relative motion between the moveable scan carriage and the transmissive original document can introduce focus errors if the distance between the sensor and the transmissive original document varies over the travel of the scan carriage. Such errors may occur when the scan carriage travel axis is not parallel with a transmissive document holder supporting the transmissive original document or when the scan carriage may rotate about the scanning axis causing the ends of the scan line to become out of focus. Such focus errors can be seen in the digitized image as artifacts which generally degrade the image quality.

Prior art configurations which mount the transmissive document holder in the scanner independently of the scan carriage inevitably introduce focus errors or artifacts into the resulting scan. That is to say because the transmissive document holder is mounted in the scanner independently of the moveable scan carriage, relative positional errors between the transmissive document holder and the sensor (i.e., the transmissive document holder and the sensor are not separated by a constant distance during travel of the scan carriage) are likely due to tolerance buildups of the mounting assemblies of the transmissive document holder and the scan carriage. The relative positional errors will then introduce the focus errors or artifacts into the resulting scan because the transmissive original document is not projected onto the sensor with uniform magnification during scanning.

One solution to reducing focus errors and/or artifacts in a scanning system is disclosed in U.S. Pat. No. 5,227,846. Therein is described a mounting system in which an original document to be scanned is supported by a glass plate at an object plane during scanning. In the '846 patent, the glass plate is supported at four points, two rollers near the outer edges of the scan line and two helical compression springs one at each end of the glass plate. This mounting system allows limited tilting aid bending of the glass plate relative to the housing which is undesirable, especially at higher resolutions, because such tilting and bending can introduce a variety of scan errors in the final digitized image, including focus and color registration errors.

OBJECTIVES OF THE INVENTION

Accordingly, it is a general object of the present invention to provide a scanning apparatus which enhances the quality of digital images obtained by scanning transmissive original documents at high resolution.

It is another object of the present invention to provide a scanning apparatus which dynamically maintains the portion of the transmissive original document being scanned and the image sensor at a substantially uniform predetermined separation during scanning.

It is a further object of the present invention to minimize detrimental effects of bending a transmissive media support element by providing a three point mounting arrangement.

It is a still further object of the present invention to eliminate the need for precise alignment of a media support element over the entire travel length of the scan.

Additional objects, advantages, and novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The present invention provides a mounting system, comprising a media holder pivotally attached to a housing at a first end and movably supported by a carriage movably supported within the housing. In particular, the media holder is movably supported by first and second mounting devices affixed to and movable with the carriage. The first and second mounting devices may each further include a respective biasing device attached to the carriage to resiliently bias the media holder against the first and second mounting devices during movement of the carriage.

The carriage in the present invention is a scan carriage having a sensing system for obtaining a digitized representation of an original document supported by the media holder. It will be recognized by those skilled in the art that an imaging device for exposing an image onto an imaging material supported by said media holder may employ the mounting system of the present invention.

One important embodiment of the present invention includes a flat-bed scanner for scanning an original document, including a scanner housing, a scan carriage movably disposed for motion relative to the scanner housing and a sensing system mounted to the scan carriage for scanning the original document. A media holder for supporting the original document for scanning along a scan line, positions the original document proximate to the scan line at a predetermined distance from the sensing system, in this case the object focal plane of the sensing system, to maintain the original document in focus throughout the scan. A media holder support system for maintaining the original document proximate to the scan line coincident with the scan line during scanning, includes a first mounting device for pivotally attaching a first end of the media holder to the housing and a second and third mounting devices affixed to the scan carriage for movably supporting the media holder as the scan carriage moves along a scan axis. Preferably, the media holder supports the original document on a top side and the second and third mounting devices support the media holder on a bottom side at point substantially directly below the scan line and proximate to first and second marginal edges of the media holder, outside the field of view of the scan line. A biasing device may also resiliently load the media holder against the first, second and third mounting devices by e.g. forcing a roller bearing against the top side of the media holder with a spring force.

Such a scanning system may scan a transmissive or a reflective original document mounted to the media holder and include an illumination system, mounted to the scan carriage, for illuminating a scan line of the original document. Furthermore, the media holder may be a transparent substrate and support the document for scanning or illuminating the document through the transmissive substrate, or the media holder may include one or more apertures extending therethrough, in which case the original document is supported such that a portion to be scanned is suspended across the aperture in the transmissive focal plane of the scanning system.

Another embodiment of the present invention includes a flat-bed scanner in which the media holder is removably mounted within the scanner housing. Here an access aperture in the housing provides access of a removable media holder to be inserted into the scanning position. A locking mechanism for preventing removal of the media holder from the scanner housing while the scan carriage is not at a home position or further configured to prevent insertion of the media holder through the aperture when the scan carriage is not at the home position may also be included to protect the media holder and scan carriage from damage or to prevent interruption of a scan.

A further feature of the mounting system includes a lateral constraining device affixed to the scan carriage for maintaining a longitudinal axis of the media holder aligned substantially perpendicular to the scan line during the travel of the scan carriage along the scan axis. The lateral constraining device, e.g. a roller bearing forced against a marginal edge of the media holder by a spring, forces the media holder against a bearing surface. The bearing surface includes two fixed roller bearings contacting an opposite marginal edge of the media holder maintain the media holder in alignment during a scan.

In another embodiment of the present invention, a flat-bed scanner for scanning an original document, includes a housing having a sensing system for obtaining a digitized representation of the original document and a media holder which is movably supported with respect to the housing for movement along a scanning axis. In this case the media holder supports an original document to be scanned along a scan line at a predetermined distance from the sensing system. A media holder support system maintains the original document proximate to the scan line coincident with the scan line, or object focal plane of the sensing system, during scanning, by providing a first, a second, and a third mounting device affixed to the housing to support the media holder during its movement along the scan axis. In this embodiment, the media holder has first and second marginal edges and the scan line scans the media holder substantially from the first marginal edge to the second marginal edge. The media holder supports the original document on a top side, the second and third mounting devices support the media holder on a bottom side at points substantially directly below the scan line and outside the field of view of the scan line near the first and second marginal edges. The first mounting device mounted to the housing pivotally supports the media holder during movement. Thus the original document and media are positioned in the object focal plane locally to the scan line during scanning of the scan line. Again, the original document may be a transmissive original document or a reflective original document and the media holder may be a transparent substrate or may include scan apertures for suspending a media to be scanned therein. Here an illumination system and scan sensor are mounted to the housing, for illuminating and scanning the scan line of the original document.

The present invention further includes a method, which includes supporting an original document on a media holder, supporting the media holder in a housing for movement with respect to a scan carriage, the scan carriage including a scanning sensor for scanning a scan line across the original document, and, transporting the scan carriage along a scan axis while supporting the media holder by first and second mounting devices mounted to and movable with the scan carriage. The method may further include supporting media holder by a third mounting device pivotally connected to the housing. An additional step of moving the carriage along the scanning axis to obtain a digitized representations of successive scan lines of the original document provides a digitized representation of the original document which has improved quality as a result of the original document being in focus over the entire scan.

In another embodiment of the present invention, the media holder is adapted for scanning original images on slide or film strips. Such a system provides a media holder which includes at least one aperture extending therethrough and wherein the scan line is coincident with a transmissive object focal plane of the scanning system at least one slide including transparent film containing at least one image to be scanned is suspended across the aperture with the transparent film substantially coincident with the transmissive object focal plane of the scanner. In the case where the slide includes first and second parallel opposed edges the media holder includes a first mounting member for supporting the first edge and a second mounting member for supporting the second edge and a biasing device connected to the first mounting member for resiliently biasing the first mounting member toward the second mounting member to hold the slide suspended across the aperture for scanning. The first and second mounting members may also include a V-shaped groove for supporting the first and second edges of the slide therein.

For film strip scanning, e.g. for strips of 35 mm negative or positive films, the media holder include at least one aperture extending therethrough. Again the scan line is coincident with a transmissive object focal plane, the original document is at least one strip of transparent film containing at least one image to be scanned, and the strip of transparent film is suspended across the aperture with the transparent film substantially coincident with the transmissive object focal plane for scanning.

In yet another embodiment of the present invention, a flat-bed scanner for scanning an original document, includes a scanner housing, a transparent supporting surface, mounted to the scanner housing, for supporting a reflective original document at a reflective object focal plane, and a transmissive media holder removably mounted through an aperture of the scanner housing for supporting a transmissive original document at a transmissive object focal plane. In this case the transmissive media holder includes a plurality of apertures extending therethrough. Slide originals or film strip originals are supported to be suspended in the plurality of apertures such that an illumination system is configured to illuminate the reflective original document or the transmissive original document and a sensing system is configured to obtain a digitized representation of the reflective original document or the transmissive original document. An optical system is configured to relay an image of the reflective original document or the transmissive original document along an optical path onto the sensing system. In this embodiment reflective originals and slide or film strip originals may be mounted and scanned in a single scanner system which may also provide a transmissive media holder which is removably mounted within the scanner housing. As described above, the illumination, the optical, and the sensing systems are mounted to a carriage which is movably supported within the housing. The transmissive media holder may be pivotally attached to the scanner housing at a first end and movably supported by the carriage for dynamically maintaining the transmissive media holder and the carriage at a predetermined distance during relative motion between the carriage and the scanner housing.

BEST MODE FOR PRACTICING THE INVENTION

Figure 1:
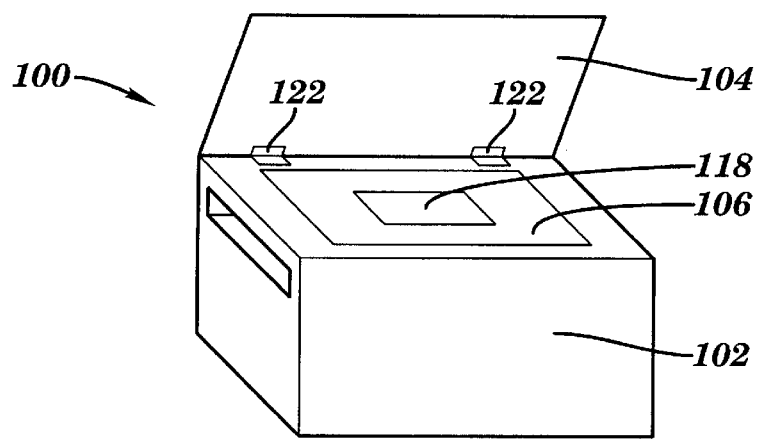
FIG. 1 is a perspective view of a first embodiment of a flat-bed scanner for scanning reflective original documents, in accordance with the present invention.

FIG. 1 is a perspective view of a first embodiment of a flat-bed scanner 100 for scanning reflective and transmissive original documents in accordance with the present invention. For reflective scanning, a reflective original document 118 is placed face down on a transparent surface (typically glass) defining a reflective (Rx) object focal plane 106, and may be held in place by a flipcover 104. Flipcover 104 is rotatably mounted to the scanner housing 102 by a pair of hinges 122 or other suitable means.

Figure 2:
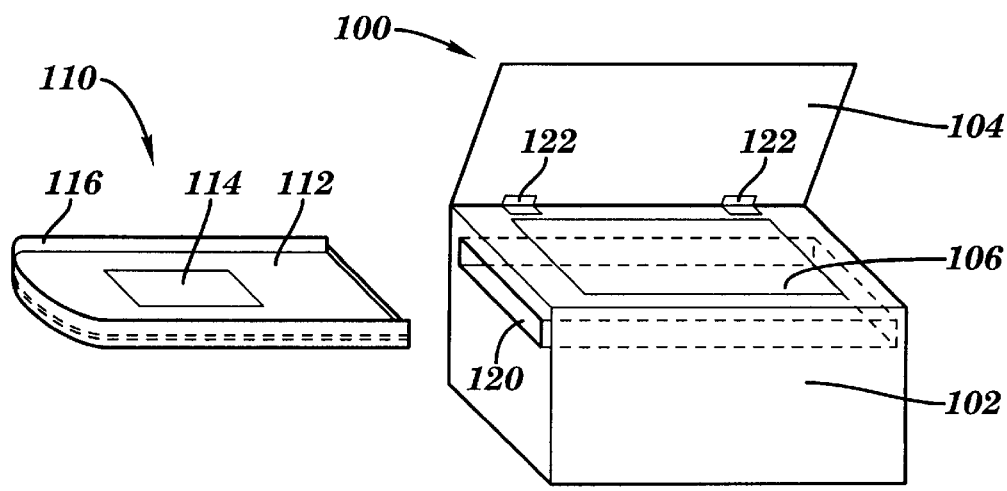
FIG. 2 is a perspective view of the flat-bed scanner of FIG. 1 detailing a first embodiment of a transmissive media holder for scanning transmissive original documents.

FIG. 2 illustrates the same flat-bed scanner 100 featured in FIG. 1, in accordance with the present invention, for scanning a transmissive original document 114. The transmissive original document 114 is secured to a surface of a supporting substrate 112 of a transmissive media holder 110. It should be readily apparent that supporting substrate 112 includes a substantially transparent material such as glass so the transmissive original document 114 can be illuminated through the supporting substrate 112 and imaged onto a sensing system 316 (shown in FIG. 3). The top surface of supporting substrate 112 defines a transmissive (Tx) object focal plane 108 (also shown in FIG. 3) when the transmissive media holder 110 is inserted into slot 120 and supported at a scan position by the scanner housing 102 and scan carriage (shown in FIGS. 3 and 4). Supporting substrate 112 may be encased by a frame 116 which facilitates handling of the transmissive media holder 110 without touching the surface of the supporting substrate. Frame 116 also serves to protect the supporting substrate 112, for example, from chipping of the edges.

Figure 3:
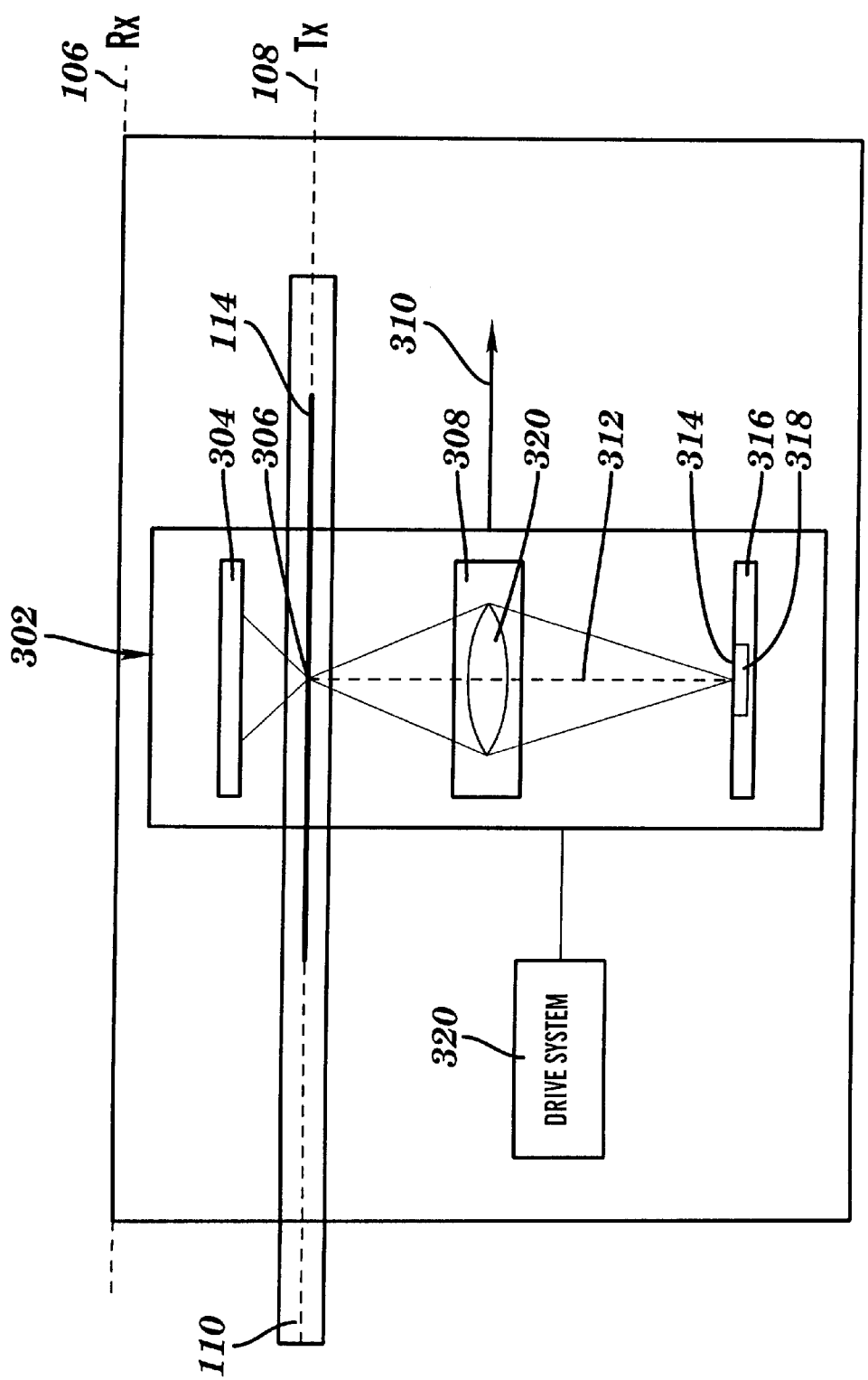
FIG. 3 illustrates in block diagram the flat-bed scanner configured to scan transmissive original documents mounted on a transmissive media holder.
Figure 4:
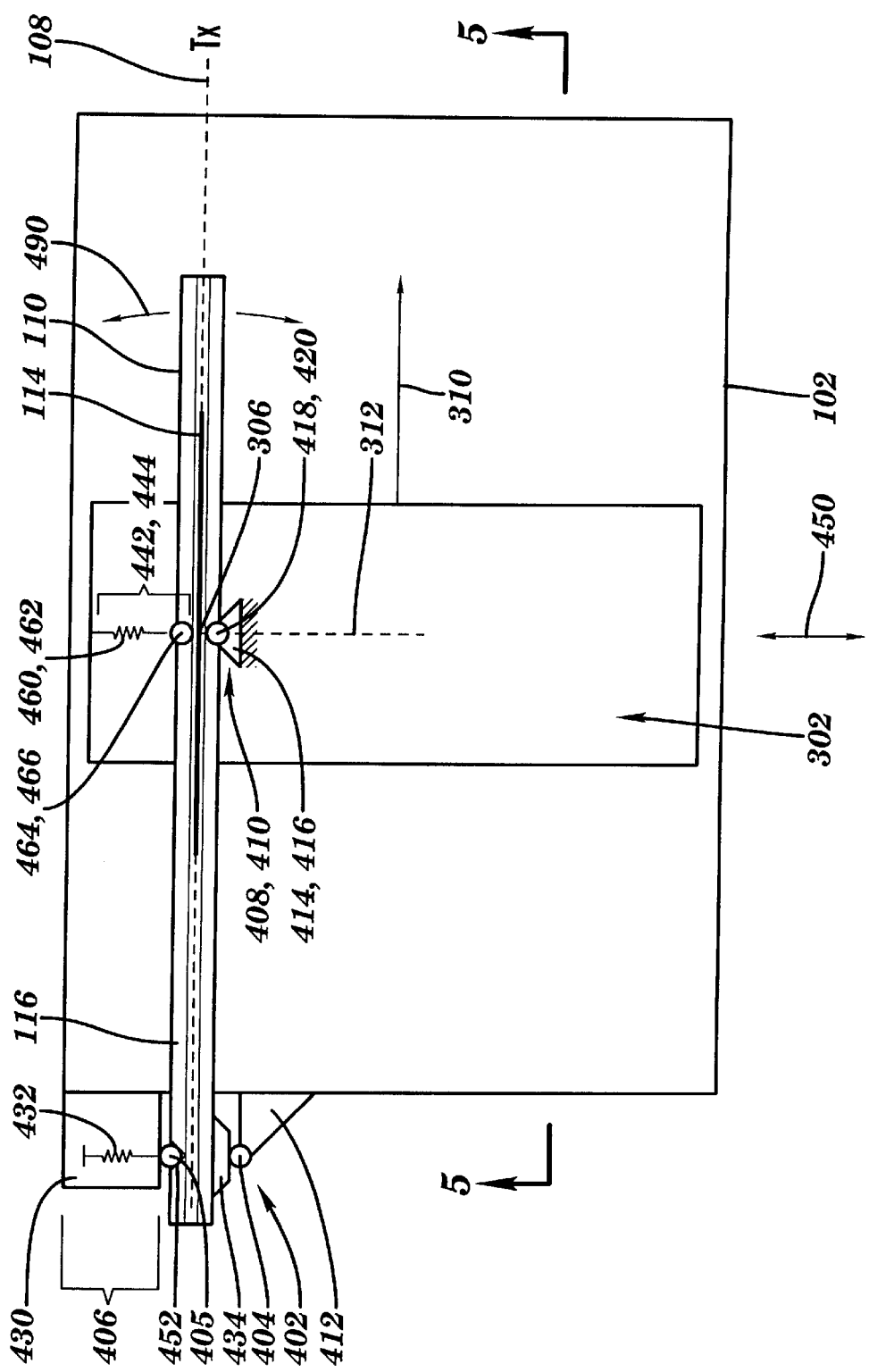
FIG. 4 is a schematic of the transmissive media holder mounting system, in accordance with the present invention.

FIGS. 3 and 4 detail the flat-bed scanner from a side view in block diagram format. The transmissive original document 114 is held at the transmissive object focal plane 108 by the transmissive media holder 110. A moveable scan carriage 302 supported by the scanner housing 102 and driven by a linear drive system 320 moves along a scanning axis 310 during scanning of the transmissive original document 114. Enclosed within the scan carriage 302 is an illumination system 304, an optical system 308, and a sensing system 316. The transmissive media holder 110 includes a longitudinal axis A—A (shown in FIG. 5) substantially parallel with the scanning axis 310 and a transverse axis parallel to a scan line 306. The scan line 306 extends perpendicularly to the scanning axis 310 and is positioned at a predetermined distance from the sensing system 316 coincident with the transmissive object focal plane 108. The illumination system 304 includes one or more illuminating lamps for illuminating the transmissive original document 114 along the entire scan line 306 and may further include other reflective or transmissive elements (not shown) for focusing the illuminating energy at the surface of the transmissive original document 114 to be scanned. The sensing system 316 includes a linear sensor array 318 together with electronics used for data acquisition and control (not shown). The present invention includes a linear CCD array 318, but alternate sensor systems such as a CCD array or photo diode detector element can be used as well. The optical system 308 includes a lens 320 which relays an image of the transmissive original document 114 along an optical path 312 onto the CCD array 318 such that the scan line 306 is defined as that portion of the transmissive original document which is imaged onto the CCD array. A more detailed description of the optical and illumination system is shown in commonly assigned U.S. patent application Ser. No. 08/922,664, filed Sep. 3, 1997, incorporated herein by reference in its entirety to provide supplemental background information which is not essential but is helpful in appreciating the applications of the present invention.

Figure 5:
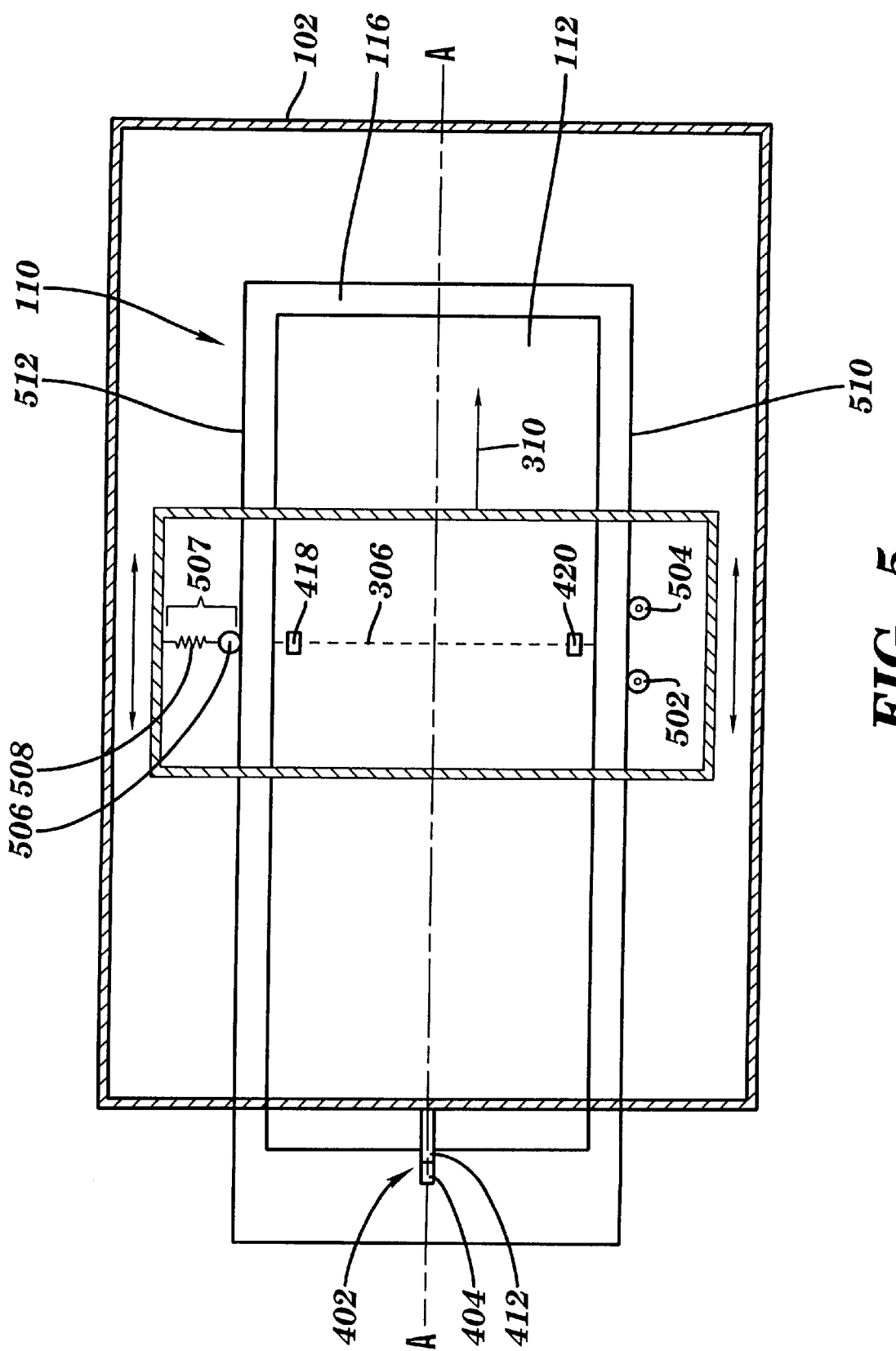
FIG. 5 is a section view of the flat-bed scanner taken along line 5—5 of FIG. 4.

It is critical that the original document 114 remain within the focal field of the lens 320 over the entire scan, especially at higher resolutions. In order to ensure that the original document 114 is appropriately scanned by the optical system 308, a media holder support system illustrated in FIGS. 4 and 5 is fashioned to movably mount the transmissive media holder 110 preferably at three points, detailed below. The media holder support system pivotally supports the transmissive media holder 110 at a first end serving to cantilever the media holder thereby allowing a free end of the media holder to move freely as the scan carriage 302 travels along the scanning axis 310. A first mounting device 402 pivotally mounts an end of the transmissive media holder 110 at the first point, preferably positioned on frame 116 along the longitudinal axis A—A of the transmissive media holder. First mounting device 402 may includes a mounting bracket 412 affixed to the scanner housing 102 for rotatably supporting a bearing or wheel 404 which supports the transmissive media holder 110 on frame 116 but allows the media holder to pivot about the first mounting point. More specifically, wheel 404 supports frame 116 on a raised portion 434 thereof, allowing the transmissive media holder 110 to be inserted into slot 120 without wheel 404 contacting (and hence scratching)the surface of supporting substrate 112. First mounting device 402 may further include a first biasing device 406 for resiliently biasing the transmissive media holder 110 against wheel 404. The first biasing device 406 may include a bracket 430, affixed to the scanner housing 102, supporting a spring 432 which mounts a wheel 405. A V-shaped groove 452 may be provided in frame 116 for locking wheel 405 to the transmissive media holder 110, thereby securing the transmissive media holder in a direction substantially parallel to the scanning axis 310.

Figure 19:
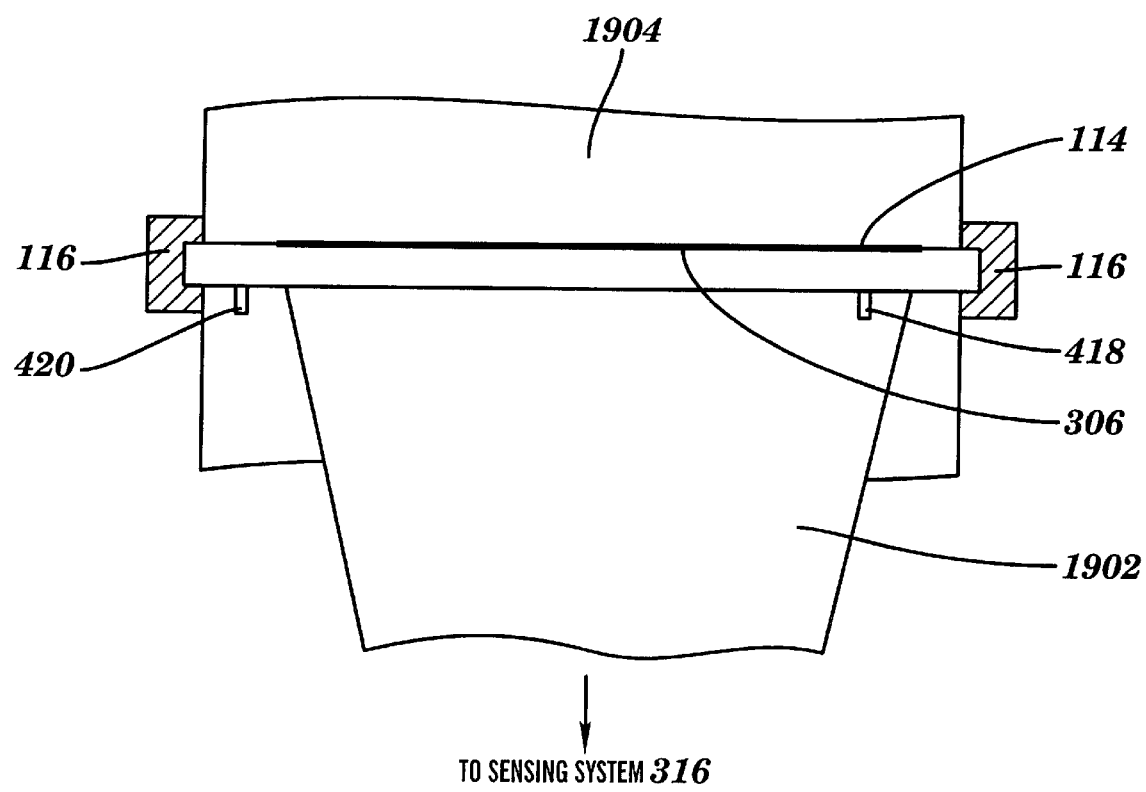
FIG. 19 is a partial sectional view taken along 19—19 of FIG. 4.

Second and third mounting devices 408, 410 respectively, are provided on the scan carriage 302 for further mounting of the transmissive media holder 110 at the second and third points. It is preferable that the second and third mounting devices 408, 410 be positioned wide apart on the transmissive media holder 110, so as to provide a stable three point base on which the media holder is supported. Referring additionally to FIG. 19, wheels 418 and 420 are positioned near the marginal edges of the scan line 306 such that a line drawn between the contact points of wheels 418 and 420 on supporting substrate 112 is parallel to the scan line 306 and coincident with an optical plane 1902 defined by the optical path 112. Wheels 418 and 420 are beneficially positioned as shown so that any movement of the transmissive media holder 110 relative to the scan carriage 302 (e.g., pivoting of the transmissive media holder about the first mounting device 402 in direction of arrow 490) will be minimized along the scan line. The second and third mounting devices 408, 410 include a support brackets 414, 416 respectively, affixed to and moveable with the scan carriage 302. Each bracket 414, 416 rotatably supports a wheel 418, 420 respectively, which preferably rolls along the bottom surface of supporting substrate 112 in the direction of the scanning axis 310, as shown in FIG. 5. It is preferable that wheels 418 and 420 roll along the surface of supporting substrate 112 out of the field of view of the sensor array 318 so any imperfections caused by debris carried by wheels 418 and 420 in the surface of supporting substrate 112 (e.g., scratches) will not appear in the resulting scan. If the transmissive original document 114 is not supported by the surface of supporting substrate 112 (i.e., supported around the edges of the transmissive original document, as will be described further below) wheels 418 and 420 would alternatively roll on the frame 116 of the transmissive media holder 110. Second and third mounting devices 408, 410 may further include second and third biasing devices 442, 444, respectively, for resiliently biasing the transmissive media holder 110 against wheels 418 and 420 during motion of the scan carriage 302. Second and third biasing devices 442, 444 may each include a spring 460, 462 respectively, affixed on one end to the scan carriage 302, and a wheel 464, 466 rotatably mounted on the other end of the spring for resiliently biasing the transmissive media holder 110 against the mounting wheels 408, 410.

Turning to FIG. 5, a lateral constraining device is provided in order to maintain the longitudinal axis A—A of the transmissive media holder 110 substantially perpendicular to the scan line 306 while the scan carriage is in motion along scanning axis 310. Movement of the transmissive media holder 110 parallel to the scan 306 line relative to the scan carriage 306 during motion of the scan carriage would introduce artifacts or "cross-scan" errors in the resulting scan. The lateral constraining device includes wheels 502, 504 rotatably affixed to the scan carriage 302 which roll along a first edge 510 of the transmissive media holder 110. The lateral constraining device further includes a biasing device 507 for resiliently biasing the transmissive media holder 110 against wheels 502 and 504. The biasing device 507 may include a spring 508, affixed on one end to the scan carriage 302, and a wheel 506 rotatably mounted on the other end of the spring which rolls along a second edge 512 of the transmissive media holder 110.

It should be recognized that the above-disclosed media holder support system has many advantages over the prior art. First, because the transmissive media holder 110 is movably supported at points along the scan line 306, the original document 114 stays within the focal range of the optical system 308 by maintaining a constant distance between the original document and the sensor array 318 mounted on the carriage 102. This allows more room for positional error in the scanning system, for example, if the transmissive original document 114 is not uniformly contacting the surface of the supporting substrate 112. Second, the scan carriage 302 drive and mounting assembly (not shown) can be constructed less expensively since travel straightness and alignment requirements are reduced. Similarly, prior art systems required the transmissive media holder to be mounted with great precision on the scanner housing so as to be substantially parallel with the scanning axis while the present invention employs the above described support system to achieve the same or better scanning result in a substantially easier fashion.

Figure 6:
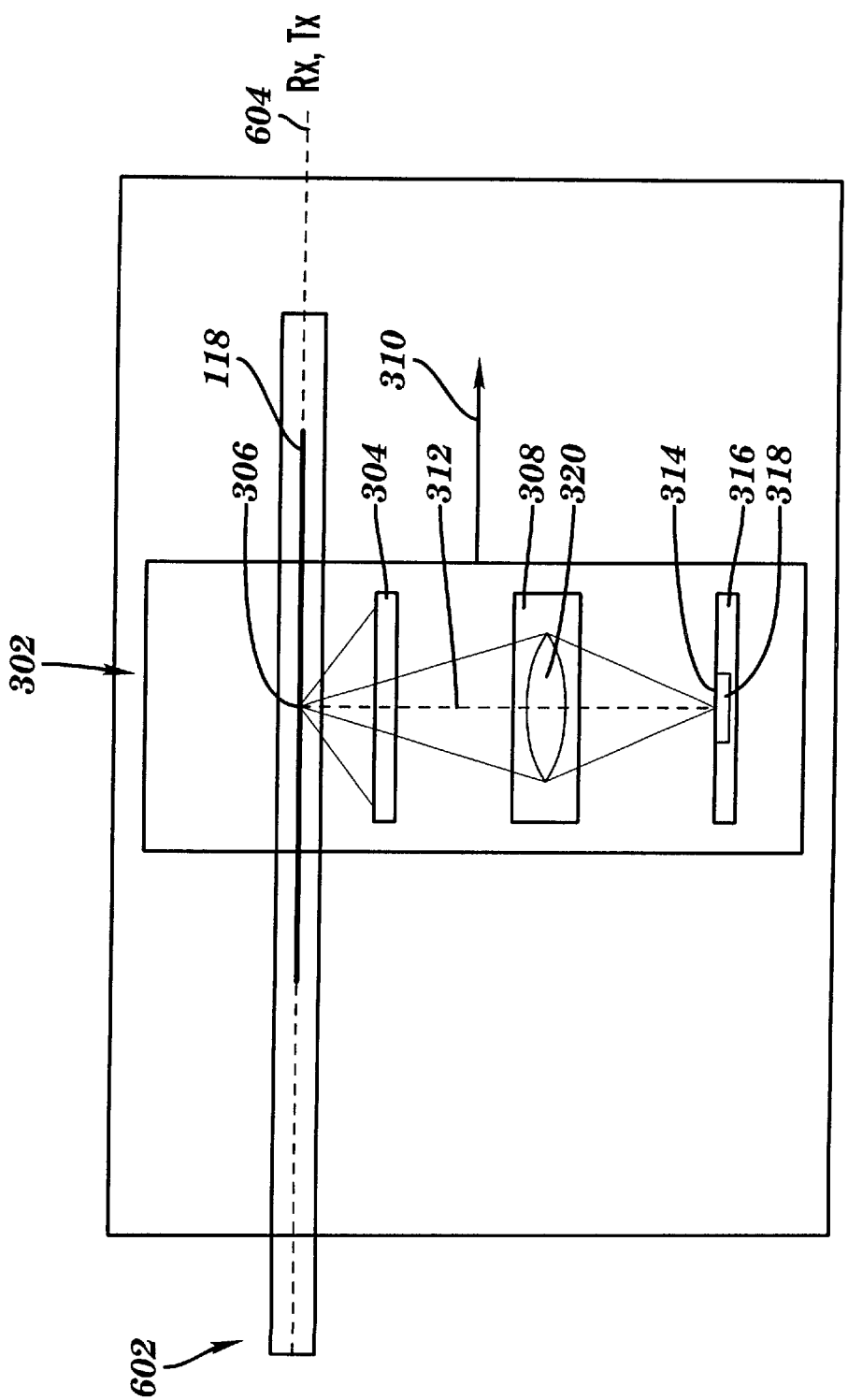
FIG. 6 illustrates in block diagram a second embodiment of the flat-bed scanner, in accordance with the present invention.

FIG. 6 illustrates a second embodiment of the flat-bed scanner, in accordance with the present invention. In this embodiment of the present invention, a removable media holder 602, which could support either a transmissive or reflective original document 118 at an object focal plane 604, is illuminated by an illumination system 304 from below. A cover (not shown), preferably having a white surface, is provided to hold the transmissive or reflective document 118 to the surface of the supporting substrate and reflect light emanating from illumination system 304 towards the sensing system 316. The media holder 602 is mounted by a media holder support system as disclosed in FIGS. 4 and 5.

Figure 7:
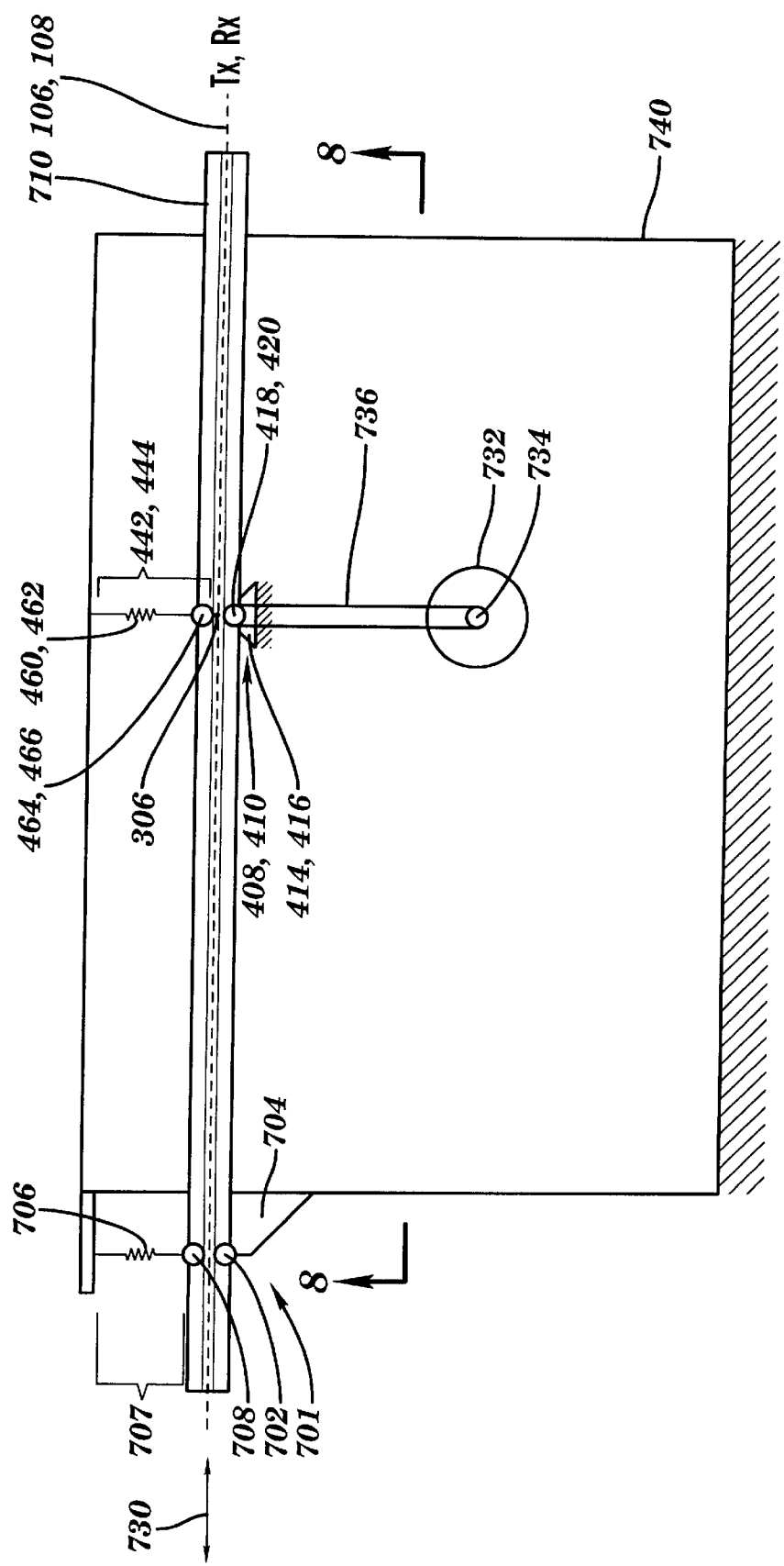
FIG. 7 is a schematic of a third embodiment of a flat-bed scanner shown, in accordance with the present invention.
Figure 8:
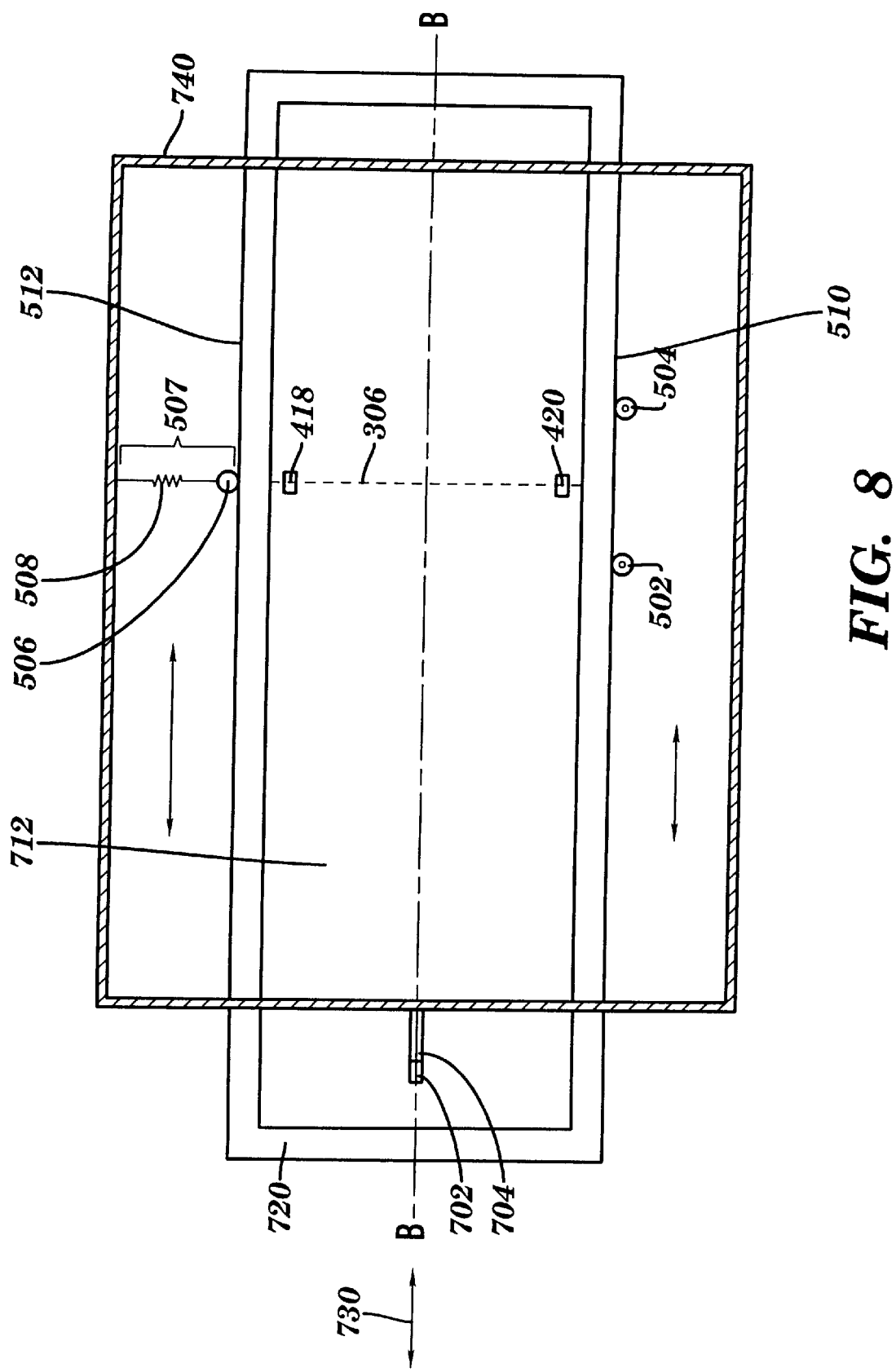
FIG. 8 is a partial section view taken along line 8—8 of FIG. 7.

FIGS. 7 and 8 illustrate a third embodiment of the flat-bed scanner, also in accordance with the present invention. In this particular embodiment, a transmissive or reflective media holder 710 is movably mounted with respect to a stationary scan carriage 740 by a media holder support system similar to that described above. Again, the media support system mounts the media holder 710 relative to the scan carriage 740 so that the media holder and sensor array 318 are maintained at a substantially constant separation distance to minimize focus errors in the final digitized image. Three mounting devices support the media holder 710 on the scan carriage 740 at three points. A first mounting device 701 is provided to include a mounting bracket 704 affixed to the scan carriage 740 for rotatably supporting a wheel 702. As shown in FIG. 8, wheel 702 rolls along the surface of supporting substrate 712 of the media holder 710 although it could roll on frame 720 if the media holder does not include supporting substrate 712 (to be described below). First mounting device 701 may further include a first biasing device 707 for resiliently biasing the media holder 710 wheel 702. First biasing device 707 includes a spring 706 affixed to the scan carriage 740 and connected to wheel 708 although other suitable biasing means could be employed. Second and third mounting devices 408, 410 each including a respective biasing device 442, 444 identical to those disclosed above are further provided to mount the media holder 710 with respect to the scan carriage 740. Similarly, a lateral constraining device (502, 504 and 507) is further provided to maintain a longitudinal axis B—B substantially perpendicular to the scan line 306. A drive device is further provided to cause the media holder 710 to move parallel to the scanning axis 730. The drive device includes a motor 732 which rotates a pulley 734 connected thereto. A belt 736 connected to wheel 418 and pulley 734 rotates wheel 418 which in turn causes motion of the transmissive media holder 110. Preferably, both wheels 418, 420 are driven by motor 732, the mechanical structure necessary to achieve this result being readily apparent by one skilled in the art.

FIGS. 9–13 detail further embodiments of the media holder for any of the above-described embodiments, in accordance with the present invention. It is advantageous if the optical path (i.e., a path defined from original document to the sensor focal plane) does not pass through any supporting substrate such as glass (for example reference numbers 112 and 712 above). This is attributable to many reasons for example, surface reflections which can cause image artifacts and imperfections in the glass, e.g., bubbles or scratches. Additionally, the glass must be kept clean of foreign objects which might scratch the glass or otherwise cause artifacts in the resulting scan. Further advantages of mounting an original document without using glass include faster preparation for scanning original documents and the elimination of messy mounting oil between the original and the glass to eliminate reflective or refractive errors, for example, caused by Newton's rings. Therefore, it is preferable to scan the original document (be it reflective or transmissive) without the optical path passing through any supporting substrate, e.g., glass, especially when scanning transmissive original documents at high resolution.

Figure 9:
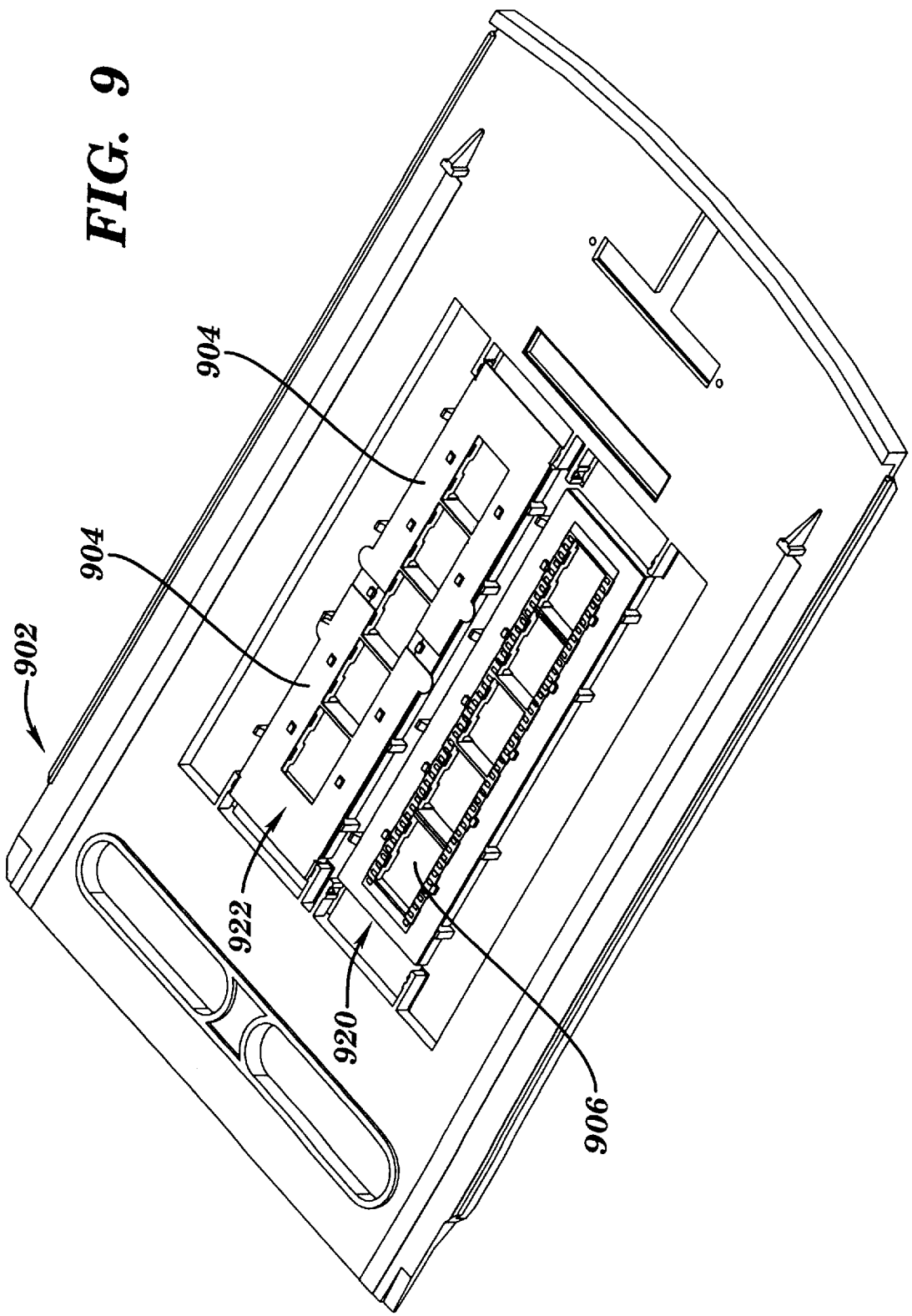
FIG. 9 illustrates a second embodiment of the transmissive media holder shown in FIG. 2.
Figure 10:
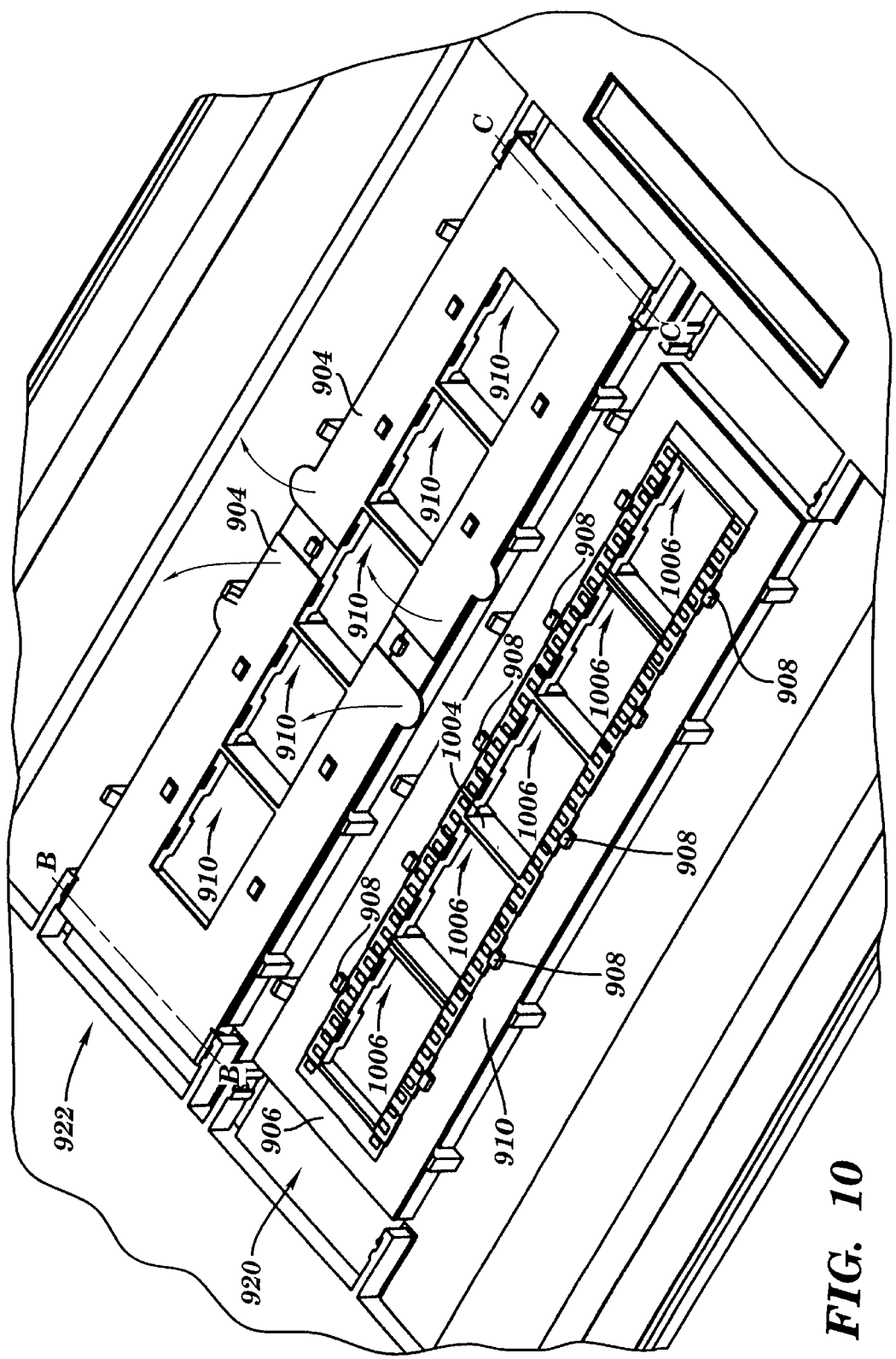
FIG. 10 is an enlarged view of the transmissive media holder shown in FIG. 9.
Figure 11:
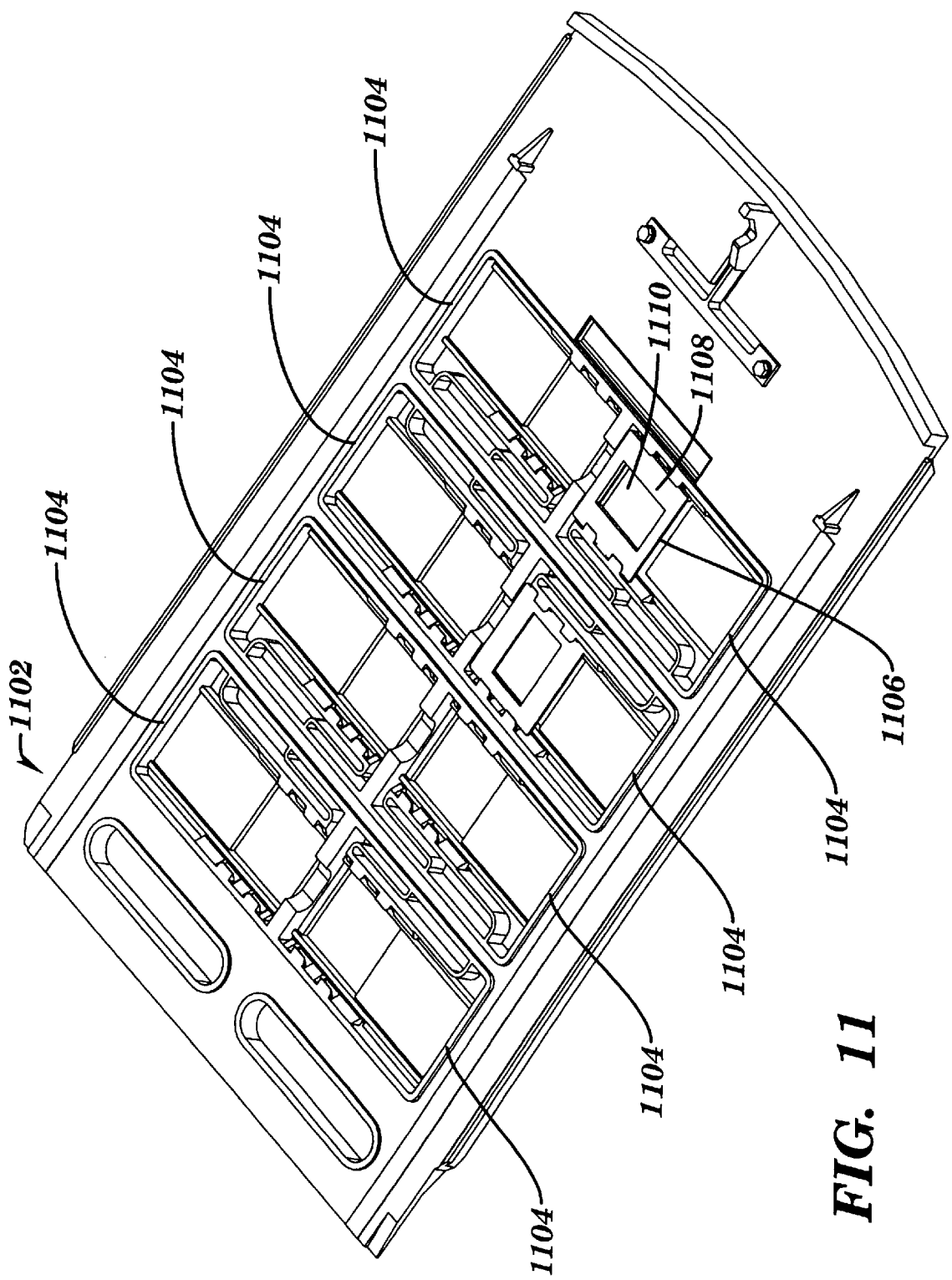
FIG. 11 illustrates a third embodiment of the transmissive media holder shown in FIG. 2.

FIGS. 9 and 10 illustrate a second embodiment of the transmissive media holder shown in FIG. 2. A transmissive media holder 902 is shown for supporting a transmissive original document 906, for example, a strip of 35 mm photographic film. Because strips of photographic film are predisposed to curl, prior art media holders sandwich the film between two sheets of glass which necessitates the tedious process of maintaining both sides of each sheet of glass (and the original document) free of scratches and foreign objects. Accordingly, the transmissive film holder 902 shown in FIG. 9 includes at least one mounting device 920, 922 (two shown in FIG. 9 for purposes of illustration) for removably supporting a transmissive original document 906 without the use of a supporting substrate such as glass. The transmissive original document 906 is consistently seated on a supporting member 1004 by a registration device, shown here to be a plurality of alignment pegs 908. Supporting member 1004 contains a plurality of openings 1006 for exposing the transmissive original document 906 to the sensor array positioned below. To hold the transmissive original document 906 uniformly to the supporting member 1004, a securing member 904 is provided, shown in mounting device 922 (but not mounting device 920 for purposes of illustration). Securing member 904 pivots about axis C—C (for facilitating placement of the transmissive original document 906 on supporting member 1004) and includes a plurality of openings 910 which interlock with the supporting member openings 1006 when closed, as shown in mounting device 922. A magnetic strip 910 may be provided on the supporting member 1004 for holding the securing member 904 to the supporting member (in which case securing member 904 would include a material having ferrous properties so as to be attracted to the magnetic strip) although other securing means could be used, for example, a latch. Although the transmissive film holder 902 of FIGS. 9 and 10 is described for supporting a transmissive original document 906, it will be recognized that the same holder 902 could support reflective original documents at a reflective object focal plane as well.

FIGS. 11–14 detail a third embodiment of the transmissive media holder shown in FIG. 2. A transmissive media holder is shown to be a transmissive slide holder 1102 for supporting a transmissive original document, for example, a slide 1106 having a frame 1108 encasing a transparent film 1110 containing an image to be scanned. Because slides have frames of differing thicknesses 1302, 1402 (see FIGS. 13 and 14) and widths 1308, a need has arisen for a mounting device to support the transparent film 1110 as close as possible along the transmissive object focal plane 1304, (so that focus errors will not be introduced into the resulting scan, as described above) regardless of the thickness and width of the slide to be scanned. Accordingly, a plurality of mounting devices 1104 is provided for mounting each slide 1106 to the transmissive slide holder 1102 with the transparent film 1110 coincident with the transmissive object focal plane 1304 regardless of the thickness and width of each slide.

Figure 12:
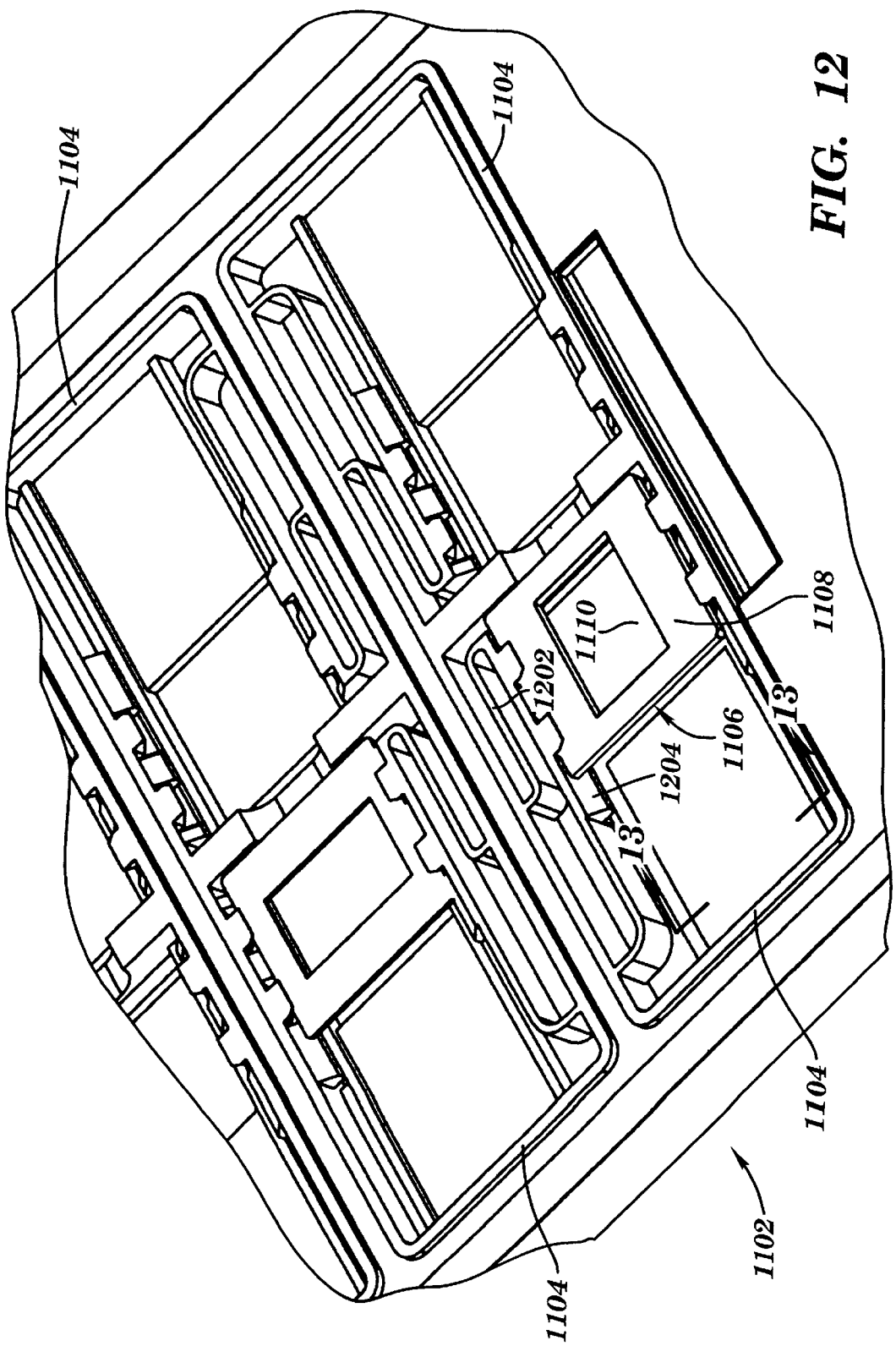
FIG. 12 is an enlarged view of the transmissive media holder shown in FIG. 11.
Figure 13:
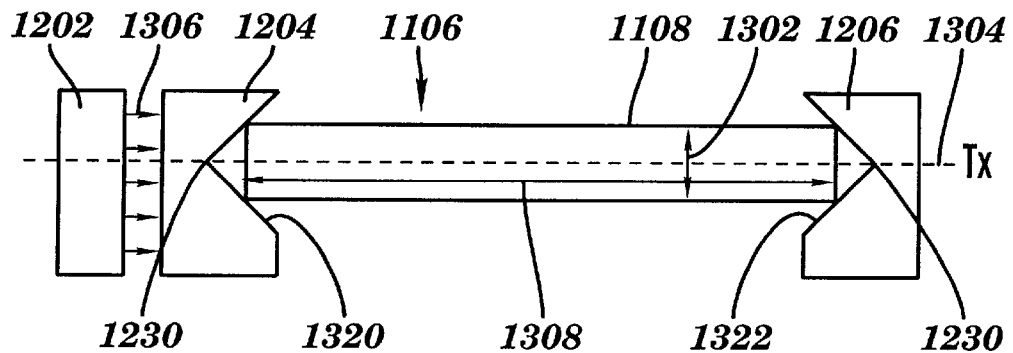
FIGS. 13 and 14 show a section view taken along line 13—13 of FIG. 14.
Figure 14:
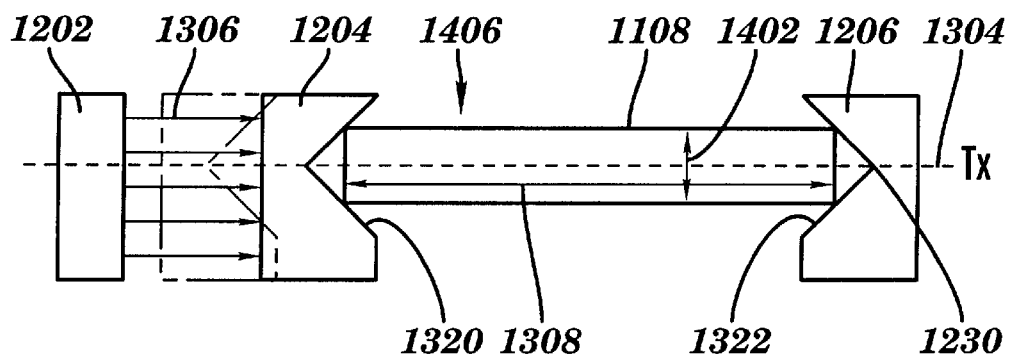

Referring now to FIGS. 12–14, each mounting device 1104 includes a first and second mounting members 1204, 1206 and a biasing device 1202. Biasing device 1202, which includes a flexure device or other suitable biasing mechanism, is connected to the transmissive slide holder 1102 and the first mounting member 1204 for biasing the first mounting member toward the second mounting member 1206 (in the direction of arrows 1306). The second mounting member 1206 is mounted to the transmissive slide holder 1102 across from the first mounting member 1204. Movement of the first mounting member 1204 parallel to the width 1308 allows slides 1206 of variable widths 1308 to be mounted. First mounting member 1204 includes a V-shaped groove 1320 to allow the transparent film 1110 of slides to be consistently positioned along the transmissive object focal plane 1304, regardless of the thickness of the slides. As shown in FIGS. 13 and 14, two slides 1106, 1406 have a constant width 1308 in both figures, but slide 1406 has a thinner frame 1402. Because slide 1406 has a thinner frame 1402, it contacts the V-shaped groove 1320 closer to the intersection 1230 of the surfaces forming the V-shaped groove. Therefore, the first mounting device 1204 must be moved in the direction of arrow 1306. It should be readily apparent that the intersection 1230 of both V-shaped grooves 1320 (i.e., the length of the V-shaped groove) should be positioned substantially parallel to the transmissive object focal plane 1304 to allow the transparent film 1110 to be positioned parallel to the transmissive object focal plane 1304, and hence in focus. Although the transmissive slide holder 1102 of FIGS. 11–14 is described for supporting a slide, it will be recognized that the same holder could support reflective original documents at a reflective object focal plane as well.

Figure 15:
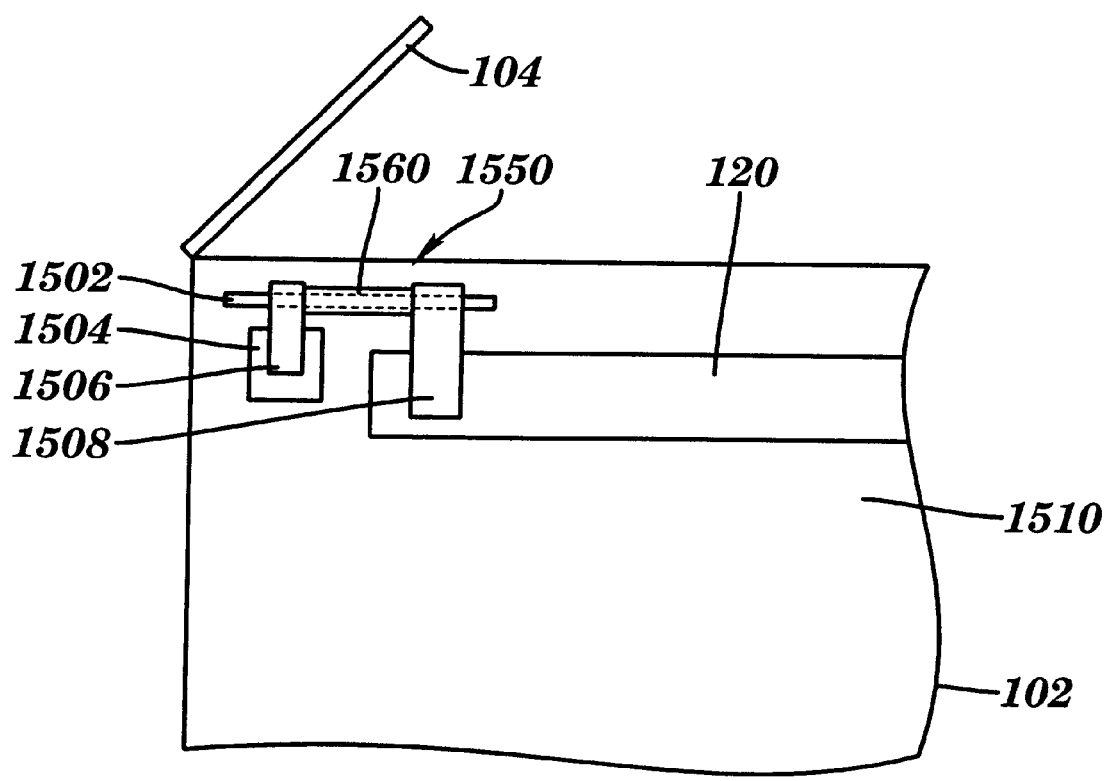
FIG. 15 is a partial end view of a flat-bed scanner illustrating a locking mechanism, in accordance with the present invention.
Figure 16:
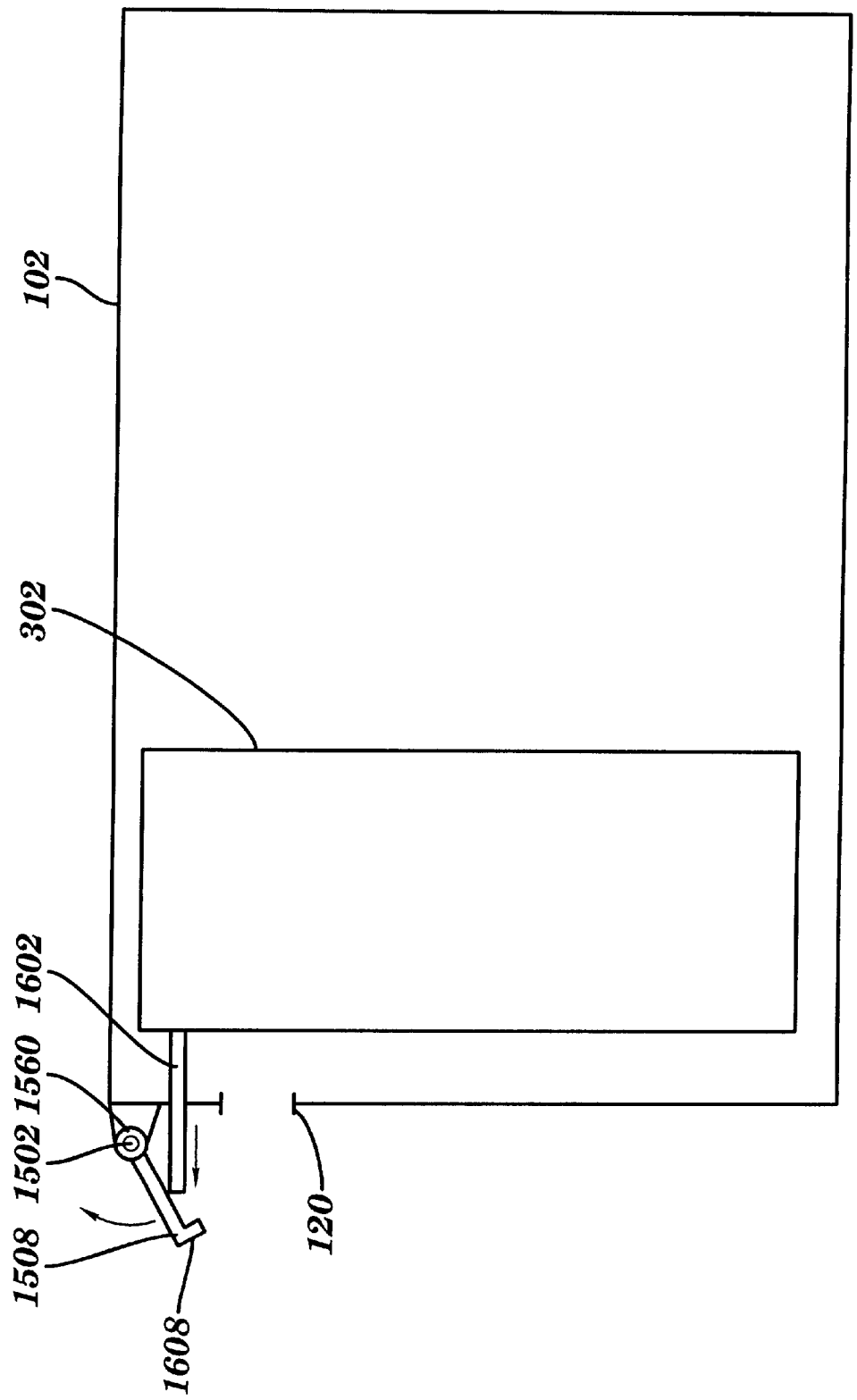
FIG. 16 is a side section view of a flat-bed scanner shown in FIG. 15.
Figure 17:
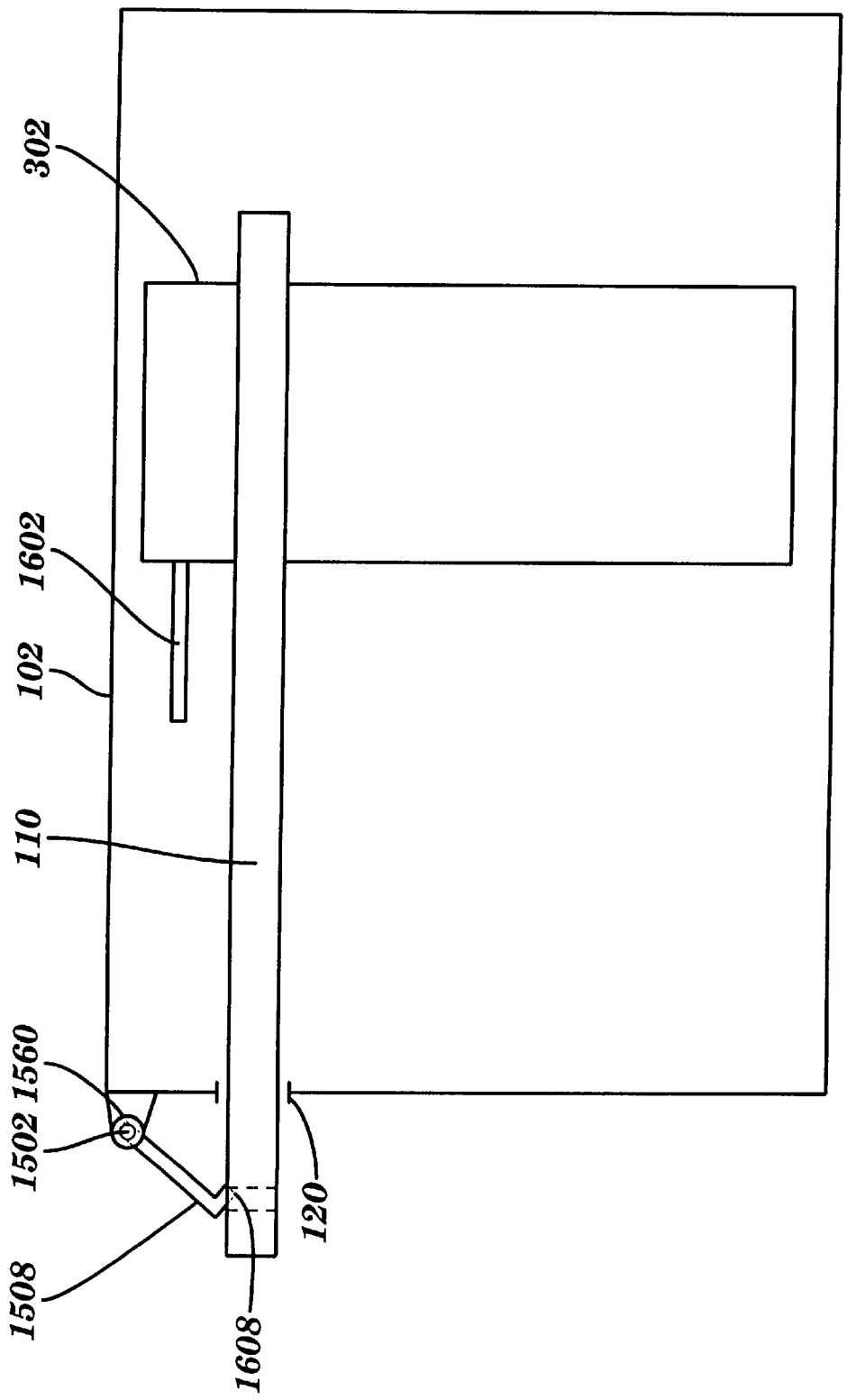
FIG. 17 is similar to FIG. 16 and particularly illustrating the locking of the transmissive media holder to the scanner housing.

FIGS. 15–17 illustrate another feature of the present invention. As particularly illustrated in FIG. 2, the transmissive media holder 110 is inserted into slot 120 of the scanner housing 102. Because the scan carriage 302 supports the transmissive media holder 110, it is preferable that the scan carriage be in a home position (i.e., the scan carriage is closest to slot 120, as shown in FIG. 16) upon insertion of the transmissive media holder through slot 120. If the scan carriage 302 is not in the home position and the transmissive media holder 110 is not inserted substantially horizontally, the supporting substrate 112 or the transmissive original document 114 supported thereon may become damaged by hitting other elements of the flat-bed scanner 100, for example, the scan carriage 302. Alternatively or in addition to, the inserted end of the transmissive media holder 110 could damage components of the scan carriage 302, for example, the illumination system 304.

One solution to this problem is only allowing insertion and removal of the transmissive media holder 110 when the scan carriage 302 is in the home position. Accordingly, a locking mechanism 1550 is provided in accordance with another aspect of the present invention. As shown in FIG. 15, locking mechanism 1550 includes a receiving lever 1506 and a locking lever 1508, both of which are fixedly attached to a rocker shaft 1560. A shaft 1502, mounted to an end face 1510 of the scanner housing 102, passes through and rotatably supports rocker shaft 1560. Thus, rotation of receiving lever 1506 about shaft 1502 causes similar rotation of locking lever 1508. A spring (not shown) resiliently biases the locking lever 1508, and hence receiving lever 1506, in a direction toward the end face 1510 (i.e., into the paper). In the position shown in FIG. 15, the locking lever 1508 would prevent insertion of the transmissive media holder 110 into slot 120.

FIG. 16 illustrates an extending member 1602 of the scan carriage 302. As the scan carriage approaches the home position, the extending portion 1602 passes through an opening 1504 in the end face 1510 and contacts thereby causing rotation of receiving lever 1506 and thus locking lever 1508 (the receiving lever is hidden from view in FIGS. 16 and 17 by the locking lever). Now, insertion of the transmissive media holder 110 is possible.

FIG. 17 illustrates the transmissive media holder 110 inserted into the scanner housing 102 and the scan carriage 302 away from the home position. The locking lever 1508 includes an L-shaped end portion 1608 which locks into a hole in the frame 116 of the transmissive media holder 110. This configuration prevents removal of the transmissive media holder 110 when the scan carriage 302 is away from the home position. When the scan carriage 302 returns to the home position, extending member 1602 will again contact and rotate receiving lever 1506 and hence 1508 allowing removal of the media holder 110. Although the above-described locking mechanism 1550 is actuated by motion of the scan carriage 302, identical actuation may be effected by electromechanical means, or other suitable means such as by hand.

Figure 18:
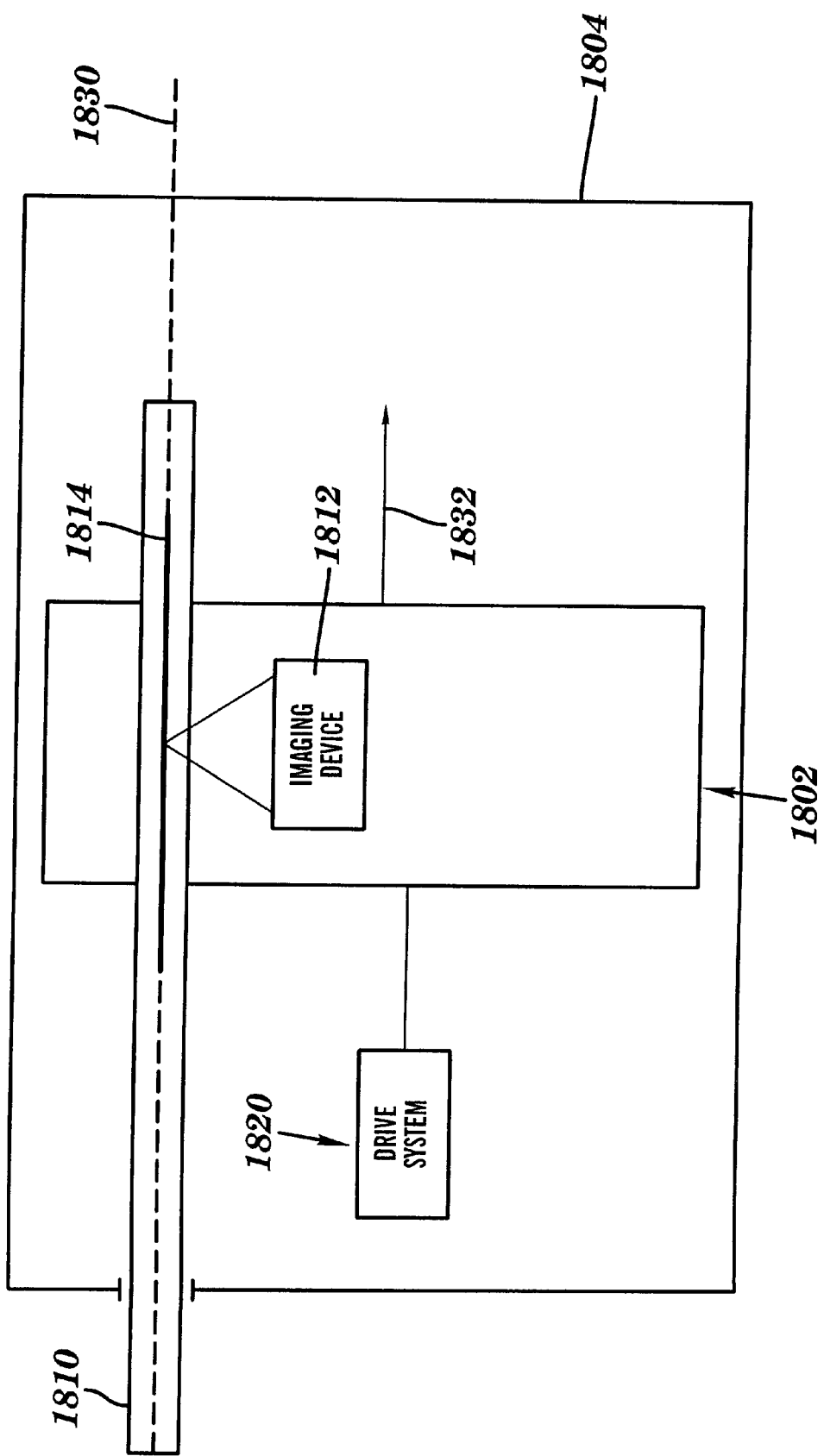
FIG. 18 is a schematic of a fourth embodiment of the present invention.

FIG. 18 illustrates a schematic of a fourth embodiment of the present invention. A media holder 1810 supports an imaging material 1814, which may for example be a film or printing plate, at an object focal plane 1830. The media holder 1810 is mounted within an imager housing 1804 by a media holder support system identical to that disclosed in FIGS. 4–5. An imaging carriage 1802 includes an imaging device 1812, which may for example include a laser thermal imaging device, for exposing images onto the imaging material 1814, one scan line 1806 at a time, as a drive system 1820 moves the imaging carriage along an imaging axis 1832.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and the present invention can be beneficially utilized in any number of environments and implementations. Accordingly, the claims set forth below should be construed in view of the full breadth and spirit of the invention as disclosed herein.

We claim:

1. A mounting system, comprising a media holder pivotally attached to a housing at a first end, and movably supported by a carriage and by a first and a second mounting device affixed to said carriage, said carriage being movably supported within said housing, said first and said second mounting device each further include a respective biasing device attached to said carriage for resiliently biasing said media holder against said first and said second mounting device.

2. The mounting system according to claim 1, wherein said carriage is a scan carriage having a sensing system for obtaining a digitized representation of an original document supported by said media holder.

3. The mounting system according to claim 1, wherein said carriage includes an imaging device for exposing an image onto an imaging material supported by said media holder.

4. A flat-bed scanner for scanning an original document, comprising:
   a scanner housing;
   a scan carriage movably disposed for motion relative to said scanner housing;
   a sensing system mounted to said scan carriage for scanning said original document;
   a media holder for supporting said original document for scanning along a scan line, said original document positioned at an object focal plane of said sensing system; and
   a media holder support system for maintaining a portion of said original document proximate to the scan line coincident with said object focal plane during scanning, said support system including a first mounting device for pivotally attaching a first end of said media holder to said housing and a second and a third mounting device affixed to said scan carriage for movably supporting said media holder proximate to said scan line.

5. The flat-bed scanner according to claim 4, wherein said media holder has first and second marginal edges and wherein said scan line scans the media holder substantially from the first marginal edge to the second marginal edge and further wherein the media holder supports the original document on a top side thereof and wherein said second and third mounting devices support the media holder on a bottom side thereof substantially directly below the scan line and proximate to said first and second marginal edges.

6. The flat-bed scanner according to claim 4, wherein said first mounting device further includes a biasing device for resiliently biasing said media holder against said first mounting device.

7. The flat-bed scanner according to claim 4, wherein said second and said third mounting devices each further include a biasing device for resiliently biasing said media holder against said second and said third mounting devices.

8. The flat-bed scanner according to claim 4, wherein said original document is a transmissive original document.

9. The flat-bed scanner according to claim 4, wherein said original document is a reflective original document.

10. The flat-bed scanner according to claim 4, further comprising an illumination system, mounted to said scan carriage, for illuminating said scan line of said original document.

11. The flat-bed scanner according to claim 4, wherein said media holder includes a transparent substrate for supporting said original document thereon.

12. The flat-bed scanner according to claim 4, wherein said media holder includes an aperture extending therethrough and said original document includes a portion to be scanned which is suspended across said aperture substantially coincident with said object focal plane for scanning.

13. The flat-bed scanner according to claim 4, wherein said media holder is removably mounted within said scanner housing, said flat-bed scanner further comprising a locking mechanism for preventing removal of said media holder from said scanner housing while said scan carriage is not at a home position.

14. The flat-bed scanner according to claim 13, wherein said media holder is removably mounted through an opening of said scanner housing, said locking mechanism being further configured to prevent insertion of said media holder through said opening when said scan carriage is not at said home position.

15. The flat-bed scanner according to claim 4, further comprising a lateral constraining device affixed to said scan carriage for maintaining a longitudinal axis of said media holder substantially perpendicular to said scan line.

16. The flat-bed scanner according to claim 4, wherein:
   said media holder includes at least one aperture extending therethrough;
   said scan line is substantially coincident with a transmissive object focal plane;
   said original document is at least one slide including a transparent film containing at least one image to be scanned;
   said at least one slide is suspended across said at least one aperture with the transparent film substantially coincident with said transmissive object focal plane for scanning.

17. The flat-bed scanner according to claim 16, wherein said at least one slide includes first and second parallel opposed edges and wherein said media holder further comprises:
   a first mounting member for supporting said first edge;
   a second mounting member for supporting said second edge; and,
   a biasing device connected to said first mounting member for resiliently biasing said first mounting member toward said second mounting member thereby supporting said slide between said first any second mounting members and suspended across said aperture substantially coincident with said transmissive object focal plain.

18. The flat-bed scanner according to claim 17, wherein said first and second mounting members include a V-shaped groove for supporting said first and second edges therein.

19. The flat-bed scanner according to claim 4, wherein:
   said media holder includes at least one aperture extending therethrough;
   said scan line is substantially coincident with a transmissive object focal plane;
   said original document is at least one strip of transparent film containing at least one image to be scanned; and,
   said at least one strip of transparent film is suspended across said at least one aperture with the transparent film substantially coincident with said transmissive object focal plane for scanning.

20. A flat-bed scanner for scanning an original document, comprising:
   a housing including a sensing system for obtaining a digitized representation of said original document;
   a media holder movably supported with respect to said housing for movement along a scanning axis, said media holder supporting an original document to be scanned along a scan line and at an object focal plane of said sensing system; and a media holder support system for maintaining a portion of said original document coincident with said object focal plane during scanning, wherein said media holder has first and second marginal edges and wherein said scan line scans the media holder substantially from the first marginal edge to the second marginal edge and further wherein the media holder supports the original document on a top side thereof and wherein a first mounting device pivotally supports said media holder with respect to said housing at a first end of the media holder and a second and a third mounting device mounted to said carriage support the media holder on a bottom side thereof at points substantially directly below the scan line and proximate to said first and second marginal edges.

21. The flat-bed scanner according to claim 20, wherein said first and said second and said third mounting devices each further include a biasing device for resiliently biasing said media holder against each respective mounting device.

22. The flat-bed scanner according to claim 20, wherein said original document is a transmissive original document.

23. The flat-bed scanner according to claim 20, wherein said original document is a reflective original document.

24. The flat-bed scanner according to claim 20, further comprising an illumination system, mounted to said housing, for illuminating said scan line of said original document.

25. The flat-bed scanner according to claim 20, wherein said media holder further includes a transparent substrate for supporting said original document thereon.

26. The flat-bed scanner according to claim 20, wherein said media holder includes an aperture extending therethrough and said original document includes a portion to be scanned which is suspended across said aperture substantially coincident with said object focal plane for scanning.

27. A method, comprising the step of:

supporting an original document on a media holder;

supporting the media holder in a housing for movement with respect to a scan carriage, said scan carriage including a scanning sensor for scanning a scan line across said original document and an object focal plane; and, transporting said scan carriage along a scan axis while supporting said media holder by first and second mounting devices mounted to and movable with said scan carriage such that a portion of said original document proximate to said scan line is maintained substantially coincident with said object focal plane.

28. The method according to claim 27, further comprising the step of supporting said media holder by a third mounting device pivotally connected to said housing.

29. The method according to claim 27, further comprising the step of moving said carriage along said scanning axis to obtain digitized representations of successive scan lines of said original document, said digitized representations of said successive scan lines together comprising a digitized representation of said original document.

* * * * *